US008861969B2

(12) United States Patent
Chan et al.

(10) Patent No.: US 8,861,969 B2
(45) Date of Patent: Oct. 14, 2014

(54) ALL-OPTICAL AM-TO-FM UP-CONVERSION FOR RADIO-OVER-FIBER

(75) Inventors: Sze-Chun Chan, Los Angeles, CA (US); Sheng-Kwang Hwang, Tainan (TW); Jia-Ming Liu, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 1333 days.

(21) Appl. No.: 12/377,586

(22) PCT Filed: Aug. 13, 2007

(86) PCT No.: PCT/US2007/075800
§ 371 (c)(1),
(2), (4) Date: Sep. 9, 2010

(87) PCT Pub. No.: WO2008/022071
PCT Pub. Date: Feb. 21, 2008

(65) Prior Publication Data
US 2011/0044692 A1    Feb. 24, 2011

Related U.S. Application Data

(60) Provisional application No. 60/837,662, filed on Aug. 14, 2006.

(51) Int. Cl.
| H04B 10/00 | (2013.01) |
| H04B 10/08 | (2006.01) |
| H04J 14/04 | (2006.01) |
| H04J 14/00 | (2006.01) |
| H04B 10/04 | (2006.01) |
| H04B 10/29 | (2013.01) |
| H04B 10/2575 | (2013.01) |

(52) U.S. Cl.
CPC ......... H04B 10/25752 (2013.01); H04B 10/29 (2013.01)

USPC ............ 398/115; 398/116; 398/20; 398/22; 398/44; 398/68; 398/184; 398/188

(58) Field of Classification Search
CPC ................. H04B 10/25752; H04B 10/29
USPC .............. 398/14, 20, 29, 44, 68, 135, 184, 398/22–27, 187–188, 115
See application file for complete search history.

(56) References Cited

U.S. PATENT DOCUMENTS 4,622,578 A * 11/1986 Rzeszewski .................. 348/487
5,134,509 A *  7/1992 Olshansky et al. ............ 398/76
(Continued)

OTHER PUBLICATIONS

P.Pottier, Electronics Letters Nov. 7, 1991, vol. 27 No. 23.*
(Continued)

*Primary Examiner* — Ken Vanderpuye
*Assistant Examiner* — Abbas H Alagheband
(74) *Attorney, Agent, or Firm* — Fenwick & West LLP (57) ABSTRACT

A laser source is configured for all-optical AM-FM up-conversion. In one exemplary embodiment, an amplitude modulated (AM) optical input signal containing a baseband signal at a sub-microwave frequency, is injected into the laser source. The amplitude of the AM optical input signal and the optical carrier frequency are adjusted so as to place the laser source in a period-one dynamical state characterized by a transitioning of the laser source from a free-running optical frequency to at least two optical frequencies having a separation distance equal to a period-one microwave frequency. As a result of the period-one dynamical state, a frequency modulated (FM) optical output signal containing the baseband signal carried at the period-one microwave frequency, is propagated out of the laser source. The period-one microwave frequency is operative as a sub-carrier signal.

16 Claims, 8 Drawing Sheets

(56) References Cited

U.S. PATENT DOCUMENTS

| | | | | |
|---|---|---|---|---|
| 5,253,259 | A | * | 10/1993 | Yamamoto et al. ............. 372/22 |
| 5,272,708 | A | * | 12/1993 | Esterowitz et al. ............. 372/20 |
| 5,682,398 | A | * | 10/1997 | Gupta ............................. 372/22 |
| 6,178,036 | B1 | * | 1/2001 | Yao ................................ 359/334 |
| 6,452,706 | B1 | * | 9/2002 | Iida et al. ...................... 398/158 |
| 7,956,799 | B2 | * | 6/2011 | Spreadbury ................... 342/201 |
| 2002/0063622 | A1 | * | 5/2002 | Armstrong et al. ........ 340/10.31 |
| 2002/0176139 | A1 | * | 11/2002 | Slaughter et al. ............. 359/172 |
| 2003/0219257 | A1 | * | 11/2003 | Williams et al. .............. 398/152 |
| 2004/0001719 | A1 | * | 1/2004 | Sasaki ........................... 398/115 |
| 2007/0023739 | A1 | * | 2/2007 | Izumi et al. ................... 252/582 |
| 2007/0206957 | A1 | * | 9/2007 | Shoji et al. .................... 398/183 |
| 2010/0014615 | A1 | * | 1/2010 | Piesinger et al. ............. 375/340 |
| 2010/0245161 | A1 | * | 9/2010 | Spreadbury ................... 342/201 |

OTHER PUBLICATIONS

P.Pottier et al., 1.5 Gbit/s Transmission System Using All Optical Wavelength Convertor Based on Tunable Two-Electrode DFB Laser, Electronics Letters Nov. 7, 1991, vol. 27 No. 23.*

Amplitude and Frequency Modulation of the Master Laser in Injection-Locked Laser Systems Erwin K. Lau, Ming C. Wu ©2004 IEEE UCLA Electrical Engineering Dept. 63-128 Engineering IV Bldg. 420 Westwood Plaza, Los Angeles, CA 90095.*

Radio-over-fiber AM-to-FM upconversion using an optically injected semiconductor laser Sze-Chun Chan; Sheng-Kwang Hwang; Jia-Ming Liu Optics Letters / vol. 31, No. 15 / Aug. 1, 2006.*

PCT International Search Report and Written Opinion, PCT/US07/75800, Mar. 14, 2008, 7 pages.

* cited by examiner

ALL-OPTICAL AM-TO-FM UP-CONVERSION FOR RADIO-OVER-FIBER

CROSS REFERENCE TO RELATED APPLICATIONS

This application is the National Stage of International Application No. PCT/US2007/075800, filed Aug. 13, 2007, and claims the benefit of U.S. Provisional Application No. 60/837,662, filed Aug. 14, 2006, both of which are incorporated by reference in their entirety.

TECHNICAL FIELD

The technical field generally relates to optical communication systems and specifically relates to an optical communication system incorporating radio-over-fiber signals.

BACKGROUND

Transmission of microwave frequency signals over fiber, termed in the industry as "radio-over-fiber" (RoF), has provided several advantages over wireless transmission. For example, a microwave signal propagated through an optical fiber can be transported over longer distances without signal degradation in comparison to a wirelessly-transmitted microwave signal that often requires line-of-sight propagation and suffers degradation due to atmospheric conditions. Typically, such a microwave signal is used as a sub-carrier signal for carrying data related to various applications. For example, in one such existing art, an RoF technique has been employed for transporting voice signals between a central office serving land-line phone customers, and a cellular base station serving cellular phone customers. Unfortunately, existing RoF systems such as this suffer from various constraints.

Figure 1:
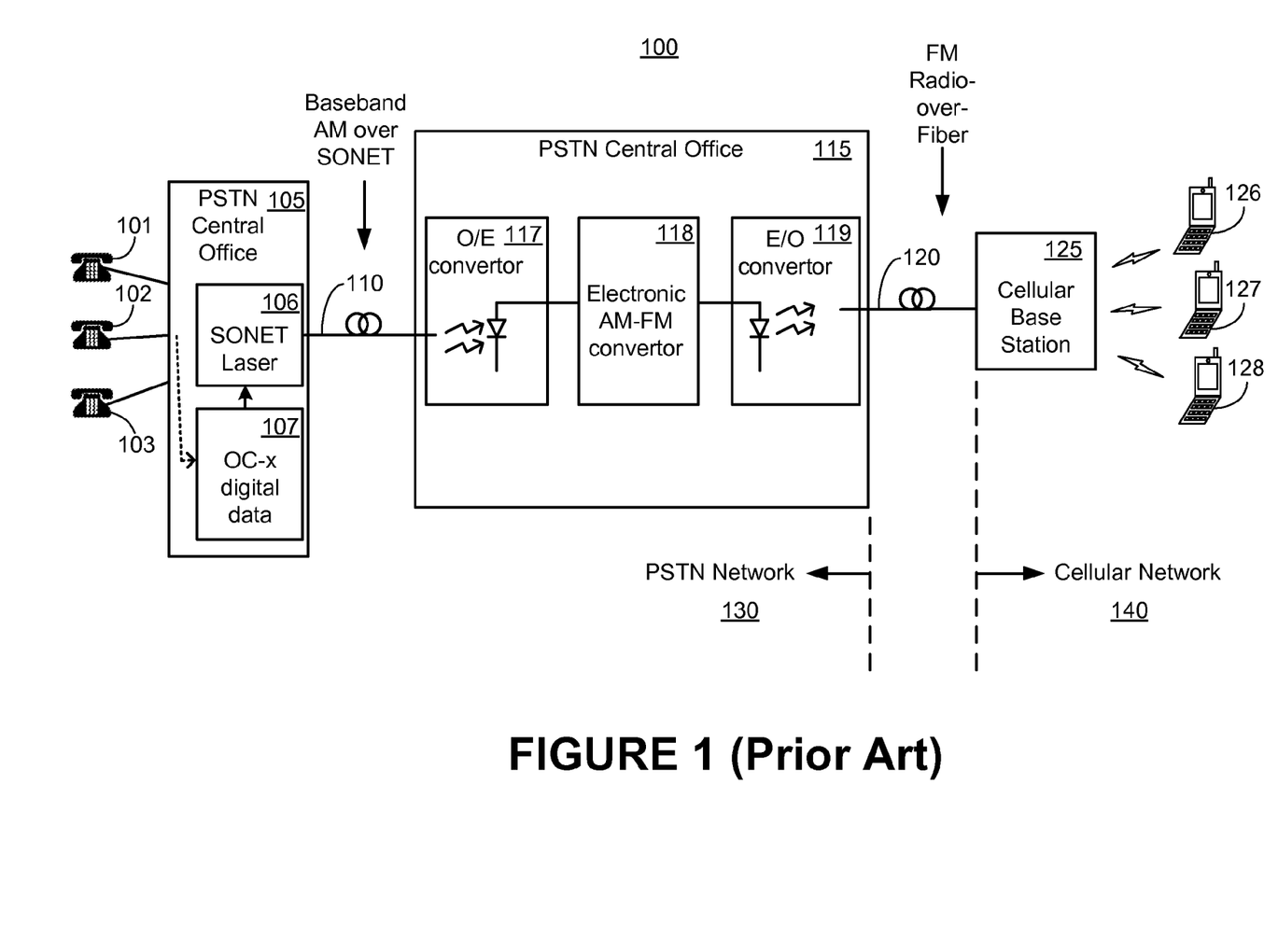
FIG. 1 is a block diagram of a prior art communications system incorporating a conversion between optical and electrical domains for implementing AM-FM up-conversion.

To illustrate at least one such constraint, attention is drawn to FIG. 1, which shows a prior-art communications system 100 that communicatively couples Public Switched Telephone Network (PSTN) 130 to cellular network 140. PSTN Central Office (CO) 105 provides telephone services to various telephone subscribers 101, 102, and 103. In one exemplary implementation, the telephone voice signals from these multiple customers are multiplexed together to create digital data that is transported over, what is known in the industry, as an Optical Carrier (OC). The OC may be operated at various bit-rates and as such is designated "OC-x" in FIG. 1. These optical bit-rates correspond to industry-wide standards that are generally known to persons of ordinary skill in this art. The OC-x digital data in PSTN CO 105 is coupled to a Synchronous Optical Network (SONET) laser 106, which utilizes baseband amplitude modulation (AM) to generate an AM modulated optical signal.

The AM modulated optical SONET signal is transmitted through optical fiber 110 to another PSTN CO 115, wherein it is directed to an Optical-to-Electrical (O/E) converter 117. O/E converter 117 typically employs a photodiode for carrying out conversion from the optical to the electrical domain. The converted electrical signal is coupled into an electronic AM-FM converter 118 wherein the signal is suitably de-modulated from the AM format into a baseband signal, which is then re-modulated into a frequency modulated (FM) signal that is in conformance with a signaling format of cellular network 140.

The FM electrical signal is coupled into electrical-to-optical (E/O) converter 119 for creating an RoF optical signal that is then transmitted via optical fiber 120 to cellular base station 125. Circuitry at cellular base station 125 de-multiplexes the multiple telephone calls carried in the RoF FM signal and routes individual voice signals to the appropriate cellular phone customers 126, 127, and 128.

As can be understood from the description above, PSTN CO 115 incorporates circuitry that converts an AM signal of a first format to an FM RoF signal of a second format by employing conversion between optical and electrical domains. The conversion circuitry introduces inefficiency in the form of potential signal degradation due to factors such as insertion loss and impedance mismatch, and further introduces reduced equipment reliability arising from the number of components used for carrying out the double conversion process (O/E followed by E/O).

SUMMARY

This Summary is provided to introduce a selection of concepts in a simplified form that are further described below in the Detailed Description of Illustrative Embodiments. This Summary is not intended to be used to limit the scope of the claimed subject matter.

In a first exemplary embodiment, an all-optical up-conversion system incorporates a laser source that is configured for receiving an amplitude modulated (AM) optical input signal carrying an AM baseband signal at a sub-microwave frequency and generating therefrom, a frequency modulated (FM) optical output signal containing the baseband signal carried in a period-one microwave frequency, the period-one microwave frequency operative as a sub-carrier signal.

In a second exemplary embodiment, a method for optical up-conversion includes injecting into a laser source, an AM optical input signal carrying an AM baseband signal at a sub-microwave frequency. The amplitude of the AM optical input signal is set for placing the laser source in a period-one dynamical state characterized by a transitioning of the laser source from a free-running optical frequency to at least two optical frequencies having a separation distance equal to a period-one microwave frequency. In this period-one dynamical state, the laser source outputs a frequency modulated (FM) output optical signal containing the baseband signal carried at the period-one microwave frequency, the period-one microwave frequency operative as a sub-carrier signal.

Additional features and advantages will be made apparent from the following detailed description of illustrative embodiments that proceeds with reference to the accompanying drawings.

BRIEF DESCRIPTION OF THE DRAWINGS

The foregoing summary, as well as the following detailed description, is better understood when read in conjunction with the appended drawings. For the purpose of illustrating all-optical up-conversion, there is shown in the drawings exemplary constructions thereof; however, all-optical up-conversion is not limited to the specific methods and instrumentalities disclosed.

DETAILED DESCRIPTION OF ILLUSTRATIVE EMBODIMENTS

The following description uses a cellular communications system incorporating Radio-over-fiber (RoF) merely for the sake of convenience, so as to illustrate the principles of all optical AM-to-FM up-conversion for RoF. However, one of ordinary skill in the art will recognize that all optical AM-to-FM up-conversion for RoF may be incorporated into a variety of other communication systems, including for example, in a computer communication system such as a local area network (LAN) or the Internet, and in a radio-frequency (RF) communications system. Additionally, while terminology related to Synchronous Optical Network (SONET) has been used herein for purposes of description, it will be understood that other signaling standards, such as those used in an all-data computer network may also be incorporated in various embodiments in accordance with all optical AM-to-FM up-conversion for RoF. Furthermore, various other embodiments encompass analog systems in addition to the digital systems described herein. Consequently, the AM baseband signal may be an analog signal, such as for example, one encountered in an RF communications system.

Figure 2:
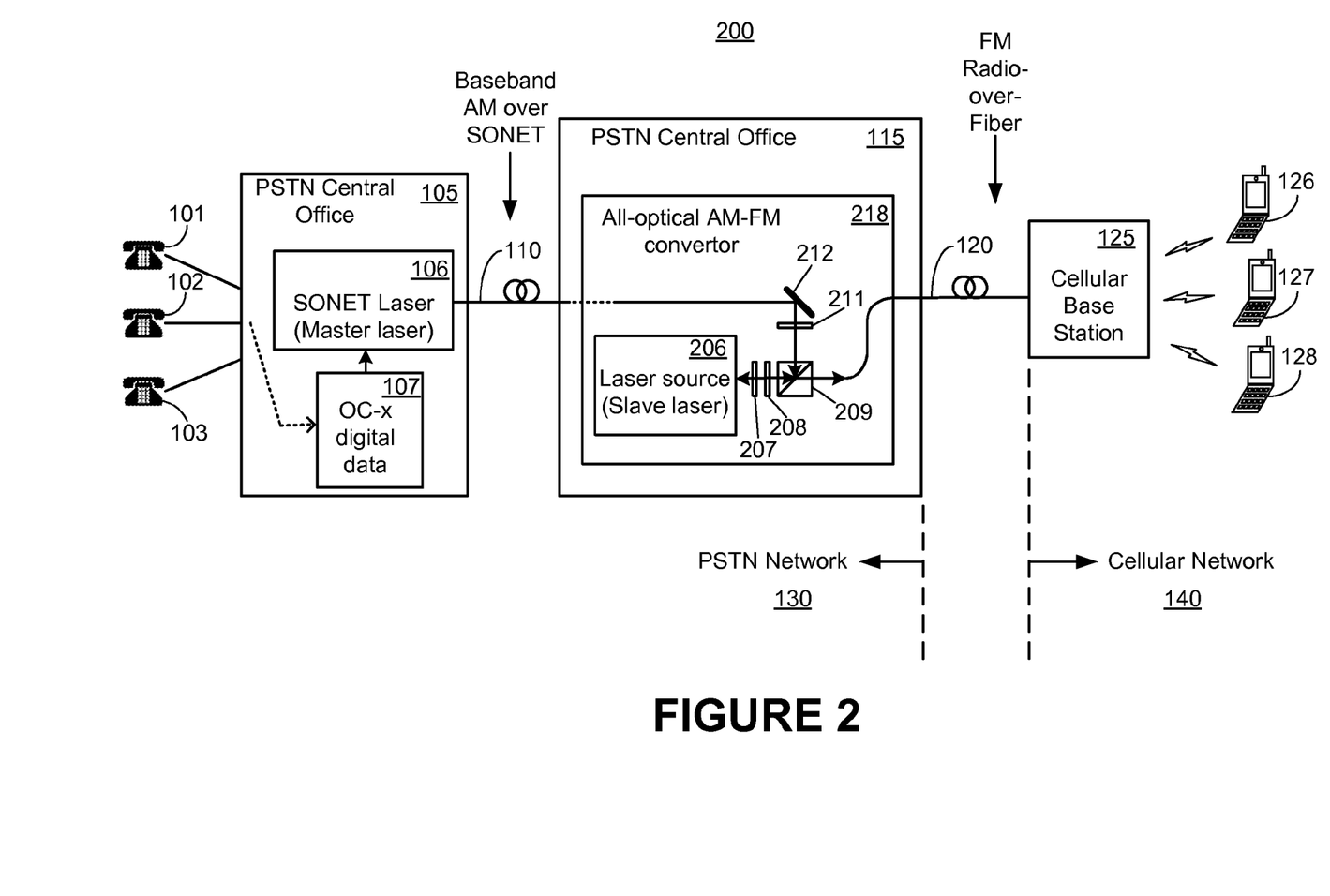
FIG. 2 is a block diagram of an example communications system wherein an all-optical converter circuit is used for AM-FM up-conversion.

FIG. 2 is a block diagram of a communications system 200 that incorporates an all-optical AM-to-FM converter circuit 218 for converting a baseband signal carried over an amplitude modulated (AM) optical input signal into a frequency modulated (FM) optical output signal containing the baseband signal carried in a microwave sub-carrier signal. Typically, the baseband signal has a data rate that extends above 1 GHz.

Communications system 200 communicatively couples Public Switched Telephone Network (PSTN) 130 to cellular network 140. PSTN Central Office (CO) 105 provides telephone services to various telephone subscribers 101, 102, and 103. In this exemplary implementation, the telephone voice signals from these multiple customers are multiplexed together to create digital data that is transported over an Optical Carrier (OC), designated in FIG. 2 as "OC-x." In accordance with all optical AM-to-FM up-conversion for RoF, OC-x can range from an OC-1 (51.85 Mbps) signal rate to an OC-24 (1.244 Gbps) signal rate. As is known in the art, other intermediate OC rates such as an OC-12 (155.52 Mbps) signal rate, can be used as well.

The OC-x digital data in PSTN CO 105 is coupled to Synchronous Optical Network (SONET) laser 106, which is alternatively referred to herein as a Master laser. Laser 106 utilizes baseband amplitude modulation (AM) to generate an AM modulated optical signal. The AM modulated SONET signal is transmitted through optical fiber 110 to PSTN CO 115, wherein is located all-optical AM-FM converter 218 in accordance with all optical AM-to-FM up-conversion for RoF. AM-FM converter 218 includes laser source 206, which is alternatively referred to herein as a Slave laser.

Typically, laser source 206 is a semiconductor laser that is operated above its threshold mode of operation (by suitably adjusting the power supply current) at around room temperature. Room temperature operation allows for easy temperature stabilization using a thermo-electric cooler and avoids complications associated with operating a semiconductor laser at a high or low temperature. A few non-exhaustive examples of suitable semiconductor lasers include a distributed feedback (DFB) laser, a distributed Bragg reflector (DBR) laser, a Fabry Perot laser, a vertical cavity surface emitting laser (VCSEL), and a quantum well laser.

Attention is once again drawn to AM-FM converter 218, which is one among several alternative embodiments of an all optical AM-to-FM up-conversion for RoF. In this exemplary embodiment, free-space optical propagation is used. However, in other embodiments, alternative optical communication media, such as optical fiber or optical waveguides, may be used instead.

The AM modulated SONET signal is received in a receiver circuit (not shown) and converted into an optical beam that is directed towards a mirror 212 contained in AM-FM converter 218. Minor 212 is suitably oriented so as to redirect the optical beam towards a polarizing beam splitter 209, which then steers the optical beam towards laser source 206 through a Faraday rotator 208 and a half-wave plate 207. Laser source 206 receives the AM modulated SONET signal contained in the optical beam and uses this optical beam to generate the FM output optical signal in an all-optical conversion process.

Figure 4:
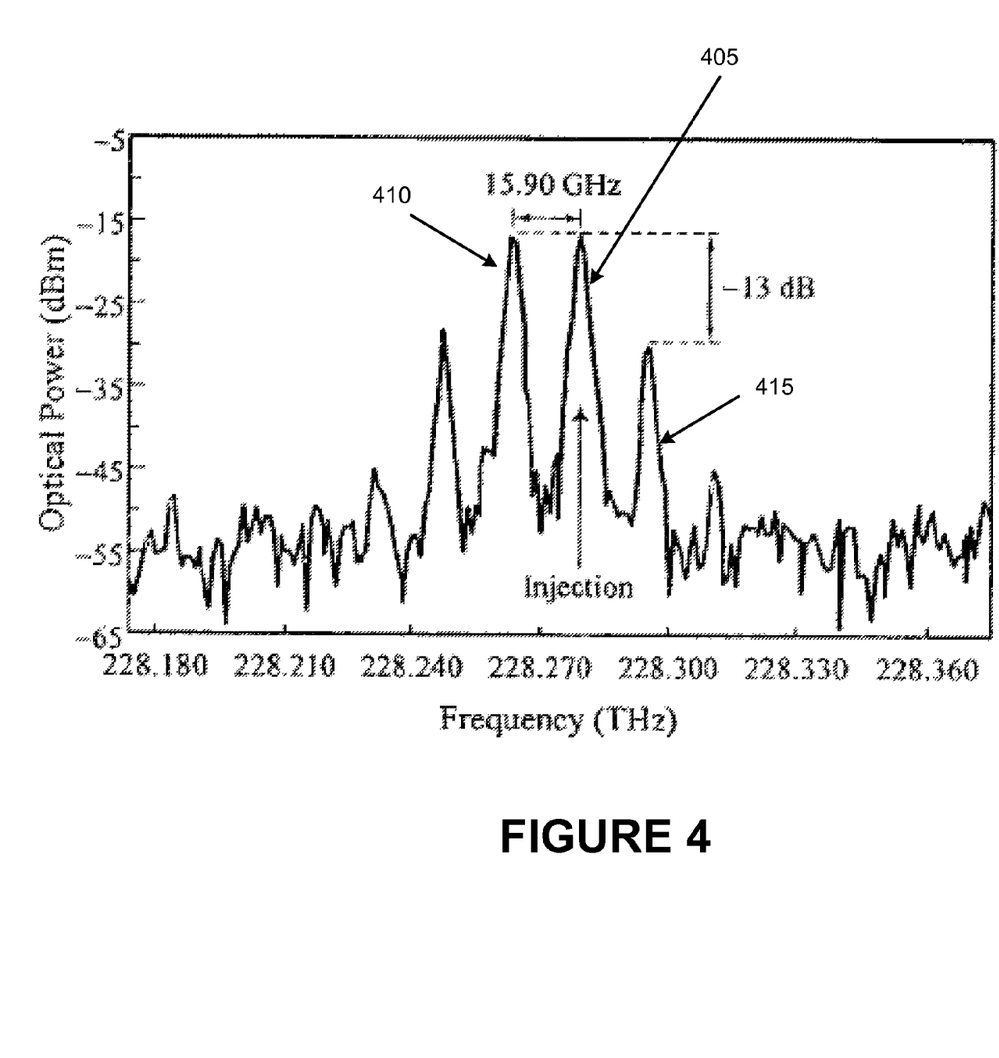
FIG. 4 illustrates an example graphical representation of a power spectrum of an optical output signal when the laser source is operating in a period-one dynamical state.

This is generally carried out by adjusting the signal strength of the optical beam using variable attenuator 211, such that laser source 206 enters a period-one dynamical state. In the absence of the injected optical signal, laser source 206 generates a free-running optical frequency, which is typically selected to be below the operating frequency of SONET Laser 106 (Master laser). However, once the optical signal generated by SONET laser 106 is injected into laser source 206, laser source 206 locks on to the frequency of SONET laser 106 and enters the period-one dynamical state. In the period-one dynamical state, the FM optical output signal contains multiple frequencies including a fundamental frequency and several sidebands. The separation distance between any two of these frequency components, for example the fundamental frequency and an adjacent sideband is equal to a period referred to as the period-one microwave frequency. In one illustrative example, as shown in FIG. 4, the period-one microwave frequency is selected to be equal to 15.90 GHz. The period-one microwave frequency operates as a sub-carrier for carrying various baseband signals, including, in one case, wherein the period-one microwave frequency carries a frequency-hop spread spectrum signal.

The period-one microwave frequency is dependant upon the signal strength of the injected optical signal as well as the free-running optical frequency. At a fixed master-slave frequency differential setting, the period-one microwave frequency increases in direct proportion to the signal strength and is approximately linear over a range that typically spans from about 5 GHz to at least 100 GHz.

The FM optical output signal generated by laser source 206 is propagated outwards through half-wave plate 207, Faraday rotator 208, and polarizing beam splitter 209 in a direction opposite to that of the incoming AM modulated SONET signal. The FM optical output signal, which constitutes a radio-over-fiber (RoF) signal, is then transmitted via optical fiber 120 into cellular base station 125. Circuitry at cellular base station 125 de-multiplexes the multiple telephone calls carried in the RoF FM signal and routes individual voice signals to the appropriate cellular phone customers 126, 127, and 128.

Figure 3:
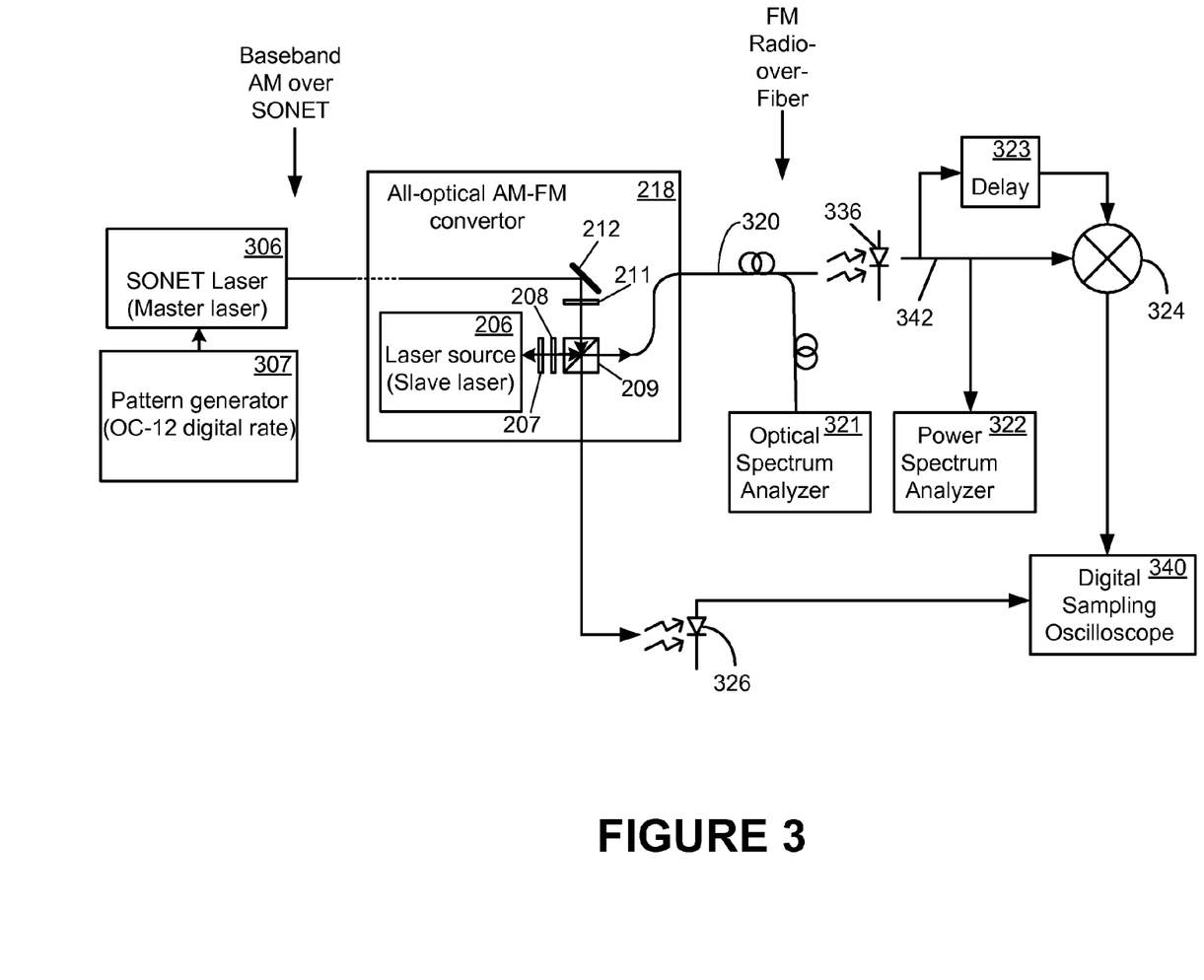
FIG. 3 is a block diagram of an example laboratory set-up for verifying performance of an exemplary embodiment of an AM-FM up-conversion system.

FIG. 3 is a block diagram of an example laboratory set-up for verifying performance of an exemplary embodiment of communication system 200 of FIG. 2. The components and operational details of AM-FM converter 218 have been described above. However, certain components shown in FIG. 2 have been replaced by laboratory components of ease of testing. Optical fiber 320, which is a 1.3 μm single-mode fiber in an experiment carried out upon this set-up, has a smaller length (of the order of a few meters) in comparison to optical fiber 120, due to experimental constraints.

Pattern generator 307 provides to SONET laser 306 (Master laser), a baseband signal in the form of a $(2^7-1)$ pseudo-random binary sequence at an OC-12 rate (around 622 Mbps). The optical signal generated therefrom by SONET laser 306, carries the baseband signal with a 12% modulation depth, which represents a typical operational level of an OC signal in a prior art communications system.

The optical signal, which is at less than 5 mW when entering AM-FM converter 218, is injected into laser source 206 (Slave laser) after suitable attenuation in variable attenuator 211. Laser source 206 produces in response, the FM optical signal containing the period-one microwave signal as described above. The operating current of laser source 206 is biased at 2.22 times the threshold operating level and the operating temperature set at around 18 degrees Celsius. It will be understood that these parameters are exemplary in nature, and other values may be used in other applications.

The FM optical signal generated by laser source 206 is propagated via optical fiber 320 to a measurement set-up that includes an optical spectrum analyzer 321, a power spectrum analyzer 322, a delay 323, a mixer 324, and a digital sampling scope (DSO) 340. Optical spectrum analyzer 321 is used to directly receive the FM optical signal from optical fiber 320 and display a power spectrum graph. Such a graph, representing data from the experiment is shown in FIG. 4 and will be described below in further detail.

Figure 5:
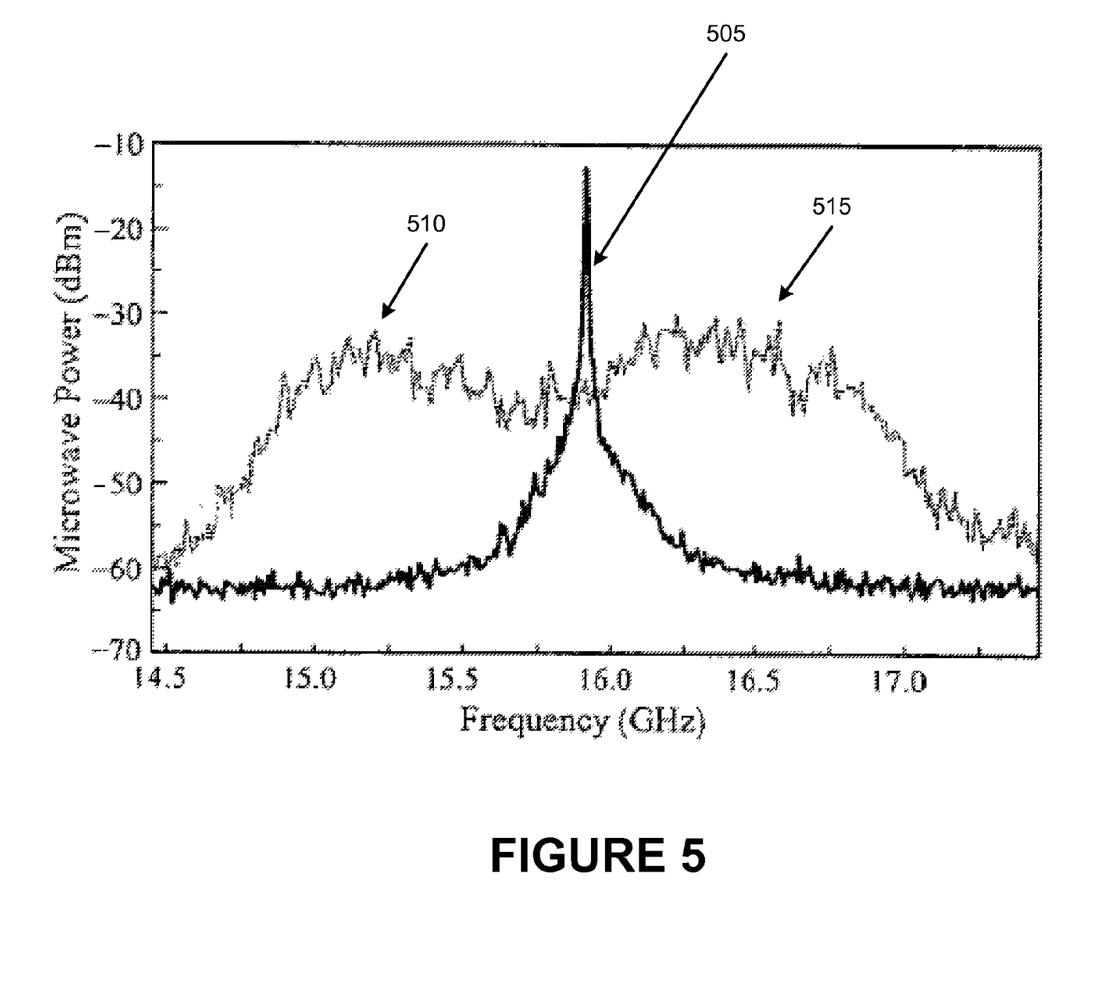
FIG. 5 illustrates an example graphical representation of a first power spectrum of an optical output signal when the laser source is operating in a period-one dynamical state under an AM optical input signal injection together with a second power spectrum when the laser source is in a period-one steady-state oscillation.

An optical detector in the form of photodetector 336, a 35 GHz photodiode, converts the FM optical signal into an electrical signal that is then directly fed into power spectrum analyzer 322 for obtaining a power spectrum graph. Such a graph, representing data from the experiment is shown in FIG. 5 and is described below in further detail.

Figure 6:
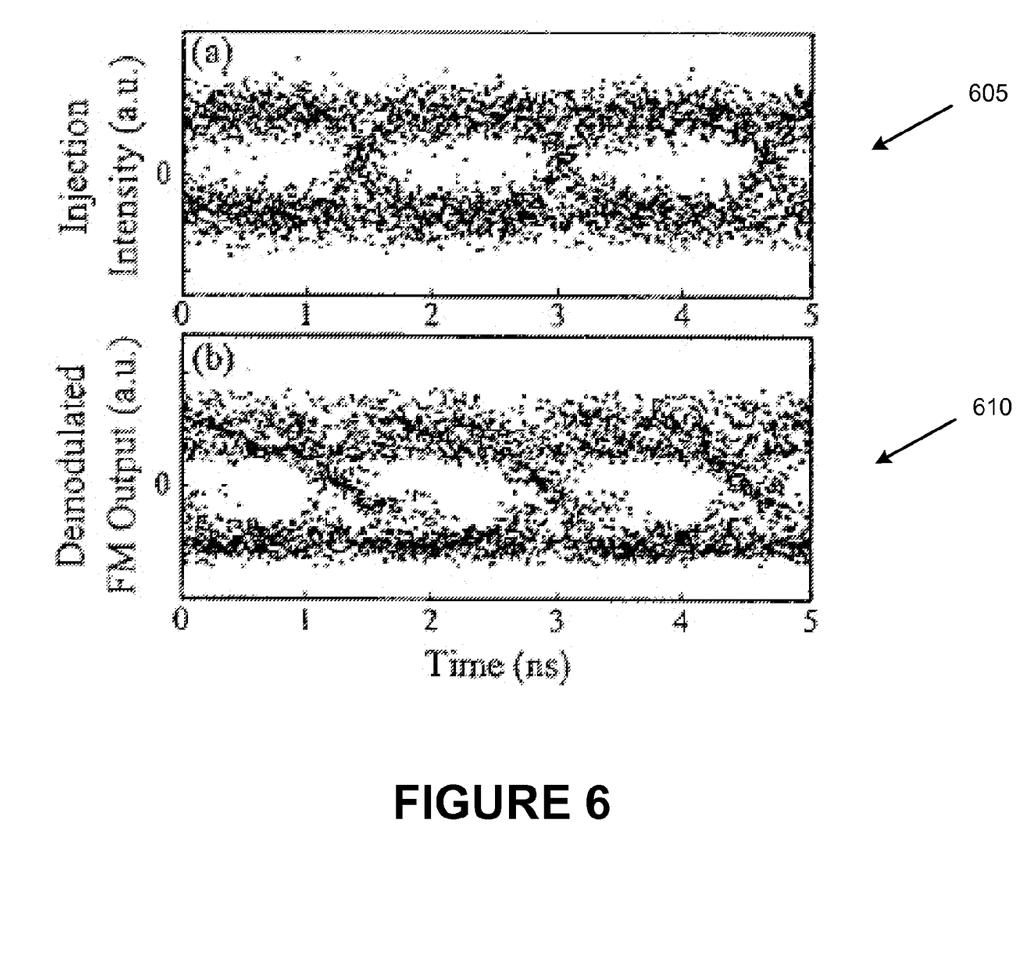
FIG. 6 illustrates an example first eye diagram corresponding to the AM optical input signal generated by the Master laser and a second eye diagram of a demodulated FM optical output signal generated by a Slave laser.

The electrical signal from photodetector 336 is also coupled to a microwave frequency discriminator comprising a delay 322 and a mixer 324. The function of the microwave frequency discriminator is to electrically mix the electrical signal received from photodetector 336 with a delayed version of the electrical signal. The delay, provided by delay 323, is set at a quarter wavelength period of a particular microwave frequency. The mixing process leads to an output demodulated signal from mixer 324 that is proportional to the instantaneous frequency deviation from the microwave frequency. The demodulated signal is coupled into DSO 340, which further receives a trigger signal in the form of an electrical signal derived from photodetector 326. DSO 340 is configured to display an eye diagram that provides information on signal fidelity. One such eye diagram obtained from the experiment, is shown in FIG. 6 and is described below in further detail.

FIG. 4 illustrates a graphical representation of a power spectrum observed in power spectrum analyzer 322 of FIG. 2 (set at 900-MHz resolution bandwidth) when laser source 206 is operating in a period-one dynamical state. Initially, laser source 206 is placed in a period-one steady state that is obtained by turning off SONET laser 306. The period-one steady state has a separation distance equal to about 15.90 GHz as shown in FIG. 4. It is to be understood that, with existing lasers, this separation distance can be as low as a few GHz (e.g., less than 3 GHz) or as high as 100 GHz, depending upon the specific laser used and the desired operating conditions. However, in this particular experiment, the separation distance was set to a relatively low 15.90 GHz.

Subsequently, SONET laser 306 is turned on and the optical signal fed into laser source 206. Under this condition, the baseband signal contained in the optical signal is carried in a frequency modulated form in sidebands of the period-one dynamical state. It will be observed that the amplitude of a first sideband 410 is approximately the same as the central microwave frequency 405, while a second sideband 415 is attenuated by about 13 dB. The nearly-single sideband behavior is a desirable feature in RoF systems because it circumvents a microwave power penalty induced by fiber chromatic dispersion.

Attention is now drawn to FIG. 5, which is a power spectrum graph obtained from power spectrum analyzer 322 of FIG. 3. First graph 505 represents the period-one steady state, while a second graph having two peaks at 510 and 515 represents the period-one dynamical state. Peak 510 corresponds to a "low" level in the optical signal provided by SONET laser 106 of FIG. 3, and peak 515 corresponds to a "high" level in the optical signal. The "low" and "high" levels are proportional to the AM modulation depth, with a greater depth leading to a greater separation of the two peaks.

FIG. 6 illustrates a first eye diagram 605 corresponding to the AM optical input signal generated by the SONET laser 106 (Master laser) as detected by photodetector 326 of FIG. 3, and a second eye diagram 610 of a demodulated FM optical output signal generated by laser source 206 (Slave laser) as generated by mixer 324 (frequency discriminator of FIG. 3). The extent of the opening in the two eye diagrams is proportional to the signal-to-noise ratio and is indicative of signal fidelity. It can be observed that the eye opening of diagram 610 (FM side) is comparable to that of diagram 605 (AM side) thereby indicating an acceptable level of signal fidelity.

Figure 7:
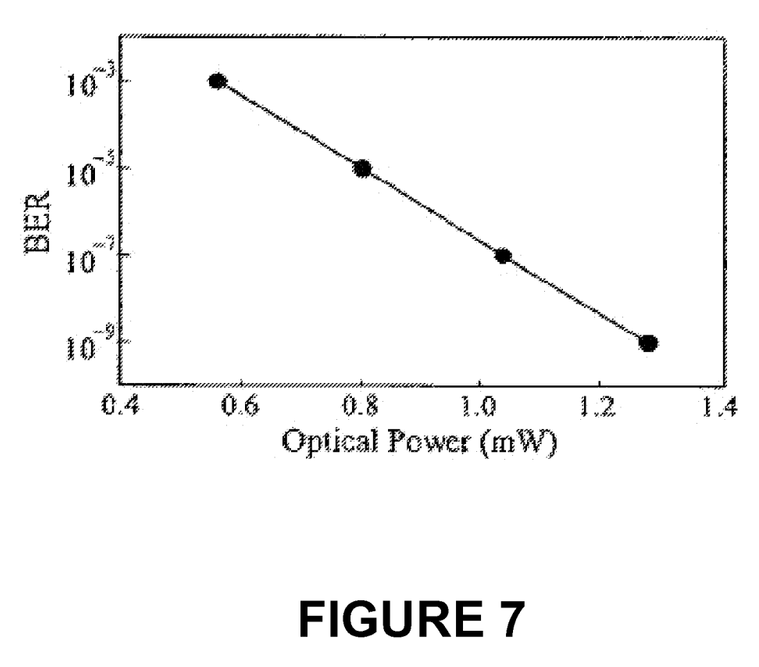
FIG. 7 illustrates a bit-error-rate (BER) of an example demodulated FM optical output signal generated by a Slave laser versus the AM optical input signal.

FIG. 7 illustrates a bit-error-rate (BER) of the demodulated optical output signal (as output by frequency discriminator of FIG. 3 for example) versus the optical power contained in the AM optical input signal generated by the SONET laser 106. It can be observed that the BER decreases linearly by a significant margin as the optical power increases. A BER of less than $10^{-9}$ is obtained when the optical power is higher than 1.28 mW.

Figure 8:
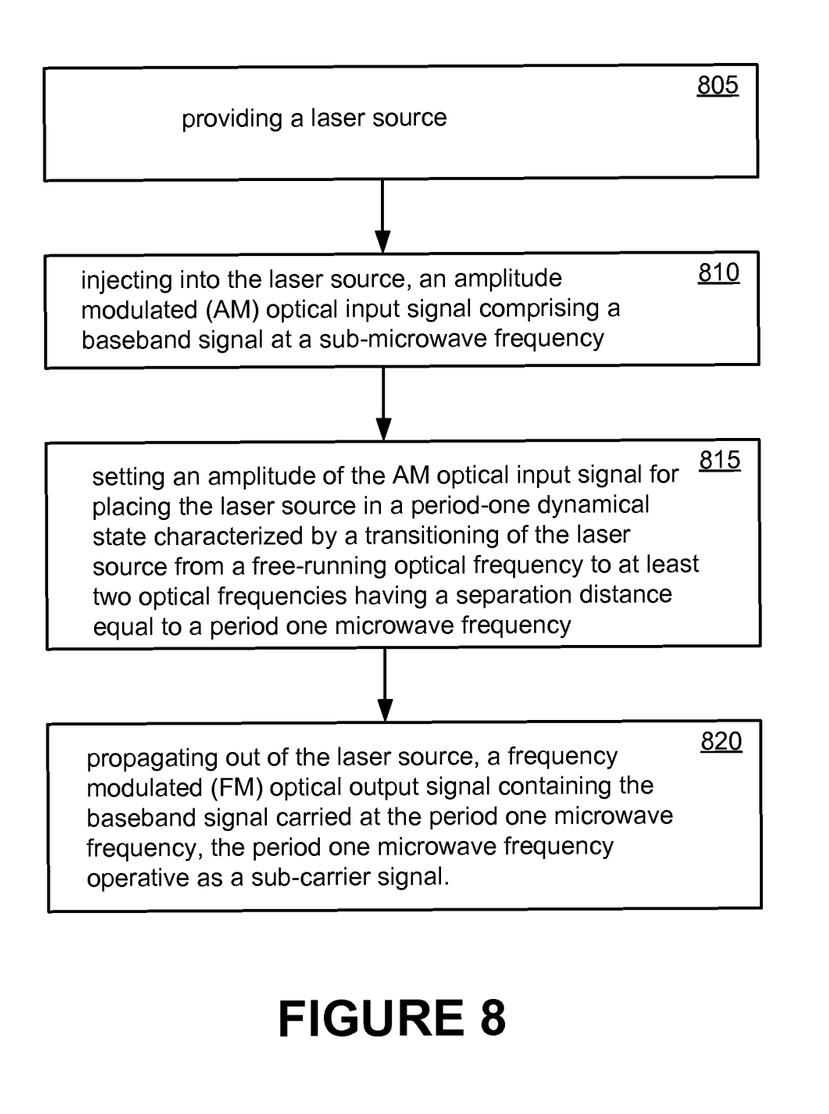
FIG. 8 is a flow diagram of an example process for optical up-conversion.

FIG. 8 is a flow diagram of an example process for optical up-conversion in accordance with all optical AM-to-FM up-conversion for RoF. At step 805, a laser source such as a 1.3 μm single-mode distributed feedback laser is provided. It is to be understood that the laser source is not limited to 1.3 μm. Any appropriate wavelength can be utilized, such as, for example, 850 nm and 1.55 μm. At step 810, an AM optical input signal comprising a baseband signal (such as the OC-12 signal provided by pattern generator 307 of FIG. 3) at a sub-microwave frequency, is injected into the laser source.

At step 815, the amplitude of the AM optical input signal is adjusted so as to place the laser source in a period-one dynamical state. Additionally, the frequency detuning of the optical carrier of the AM signal with respect to the free-running frequency of the slave laser is properly adjusted. The period-one dynamical state is characterized by a transitioning of the laser source from a free-running optical frequency to at least two optical frequencies having a separation distance equal to the period-one microwave frequency. This aspect has been described above using FIG. 3, for example.

At step 820, an FM optical output signal is propagated out of the laser source. The FM output optical signal contains the baseband signal carried in the period-one microwave frequency.

While all optical AM-to-FM up-conversion for RoF has been described by way of example and in terms of the specific embodiments, it is to be understood that all optical AM-to-FM up-conversion for RoF is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Any of the above described steps may be embodied as computer code on a computer readable medium. The computer readable medium may reside on one or more computational apparatuses and may use any suitable data storage technology.

All optical AM-to-FM up-conversion for RoF can be implemented in the form of control logic in software or hardware or a combination of both. The control logic may be stored in an information storage medium as a plurality of instructions adapted to direct an information processing device to perform a set of steps disclosed in an embodiment of all optical AM-to-FM up-conversion for RoF. Based on the disclosure and teachings provided herein, a person of ordinary skill in the art will appreciate other ways and/or methods to implement all optical AM-to-FM up-conversion for RoF.

The above description is illustrative but not restrictive. Many variations of all optical AM-to-FM up-conversion for RoF will become apparent to those skilled in the art upon review of the disclosure. The scope of all optical AM-to-FM up-conversion for RoF should, therefore, be determined with reference to the pending claims along with their full scope or equivalents.

What is claimed:

1. An optical up-conversion system, comprising:
   a laser source configured for receiving an amplitude modulated (AM) optical input signal comprising a baseband signal at a sub-microwave frequency, and converting the baseband signal to a frequency modulated (FM) optical output signal carried by a microwave frequency generated by a single-frequency periodic oscillation of the laser and operative as a sub-carrier signal,
   wherein the laser source is placed in a period-one dynamical state comprising at least two optical frequency sidebands having a separation distance equal to the microwave frequency, and wherein the optical frequency sidebands comprise a first lower frequency sideband that is more than 10 dB stronger than a second higher frequency sideband.

2. The optical up-conversion system of claim 1, wherein the microwave frequency is directly proportional to an amplitude of the AM optical input signal.

3. The optical up-conversion system of claim 2, further comprising:
   an optical circulator configured for propagating in a first direction, the AM optical input signal into the laser source, and for propagating in an opposite direction, the FM optical output signal.

4. The optical up-conversion system of claim 2, wherein the AM optical input signal is a Synchronous Optical Network (SONET) optical signal.

5. The optical up-conversion system of claim 4, wherein the SONET optical signal is an optical carrier (OC) signal defined as an OC-12 signal operating at around 622 Mbps.

6. The optical up-conversion system of claim 4, wherein the SONET signal is an OC signal selected from amongst OC signals ranging from OC-1 at 51.85 Mbps to OC-24 at 1.244 Gbps.

7. The optical up-conversion system of claim 2, wherein the baseband signal is in a range from about DC to about 1 GHz.

8. The optical up-conversion system of claim 2, wherein the microwave frequency ranges from about 5 GHz to about 100 GHz.

9. The optical up-conversion system of claim 2, wherein the microwave frequency comprises a frequency-hop spread spectrum signal.

10. The optical up-conversion system of claim 1, wherein the laser source is operative at room temperature.

11. A method for optical up-conversion, comprising:
    injecting into a laser source, an amplitude modulated (AM) optical input signal comprising a baseband signal at a sub-microwave frequency;
    setting an amplitude of the AM optical input signal for placing the laser source in a period-one dynamical state characterized by a transitioning of the laser source from a free-running optical frequency to at least two optical frequencies having a separation distance equal to a microwave frequency generated by a single-frequency periodic oscillation of the laser, wherein the at least two optical frequencies comprise a first lower frequency sideband that is more than 10 dB stronger than a second higher frequency sideband; and
    propagating out of the laser source, a frequency modulated (FM) optical output signal containing the baseband signal carried at the microwave frequency, the microwave frequency operative as a sub-carrier signal.

12. The method of claim 11, further comprising:
    setting the laser source to the free-running optical frequency prior to injecting the AM optical input signal into the laser source.

13. The method of claim 11, wherein the FM optical signal comprises a radio-over-fiber (RoF) signal.

14. The method of claim 11, wherein an amplitude of the first lower frequency sideband is approximately the same as an amplitude of a fundamental frequency of the sub-carrier signal.

15. The method of claim 11, wherein providing the laser source comprises providing a semiconductor laser.

16. The method of claim 15, wherein the semiconductor laser is one of a) a distributed feedback (DFB) laser, b) a distributed Bragg reflector (DBR) laser, c) a Fabry Perot laser, d) a vertical cavity surface emitting laser (VCSEL), and e) a quantum well laser.

* * * * *